(12) United States Patent
Malapati et al.

(10) Patent No.: US 8,104,841 B2
(45) Date of Patent: Jan. 31, 2012

(54) ENERGY ABSORBING SEAT ANCHOR RESTRAINT SYSTEM FOR CHILD SAFETY SEATS

(75) Inventors: Reddy Malapati, Ypsilanti, MI (US);
Chris O'Connor, Livonia, MI (US);
Rodney Simon, Warren, MI (US);
Pardeep Kumar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1045 days.

(21) Appl. No.: 11/608,716

(22) Filed: Dec. 8, 2006

(65) Prior Publication Data
US 2008/0136224 A1    Jun. 12, 2008

(51) Int. Cl.
*B60R 22/00* (2006.01)

(52) U.S. Cl. .................................. 297/468; 296/35.2

(58) Field of Classification Search ............ 296/187.05, 296/68.1, 65.02, 65.03, 1.04, 63; 297/471, 297/472, 216.1, 216.11, 468, 476, 253; 280/801.1, 280/805
See application file for complete search history.

(56) References Cited

U.S. PATENT DOCUMENTS

| 3,198,288 | A | | 8/1965 | Presunka | |
|---|---|---|---|---|---|
| 3,547,468 | A | | 12/1970 | Giuffrida | |
| 3,680,913 | A | * | 8/1972 | Seybold | 297/472 |
| 3,694,028 | A | * | 9/1972 | Andres et al. | 280/805 |
| 3,938,627 | A | * | 2/1976 | Nagazumi | 188/371 |
| 3,973,650 | A | * | 8/1976 | Nagazumi | 188/371 |
| 4,060,278 | A | * | 11/1977 | Maeyerspeer | 297/472 |
| 4,292,932 | A | * | 10/1981 | Wooderson | 119/771 |
| 4,358,136 | A | | 11/1982 | Tsuge et al. | |
| 4,457,251 | A | * | 7/1984 | Weman et al. | 116/212 |
| 5,286,056 | A | * | 2/1994 | Speich | 280/777 |
| 5,356,179 | A | * | 10/1994 | Hildebrandt et al. | 280/777 |
| 5,487,562 | A | * | 1/1996 | Hedderly et al. | 280/777 |
| 5,618,059 | A | * | 4/1997 | Kim | 280/805 |
| 5,639,144 | A | | 6/1997 | Naujokas | |
| 5,706,704 | A | * | 1/1998 | Riefe et al. | 74/493 |
| 5,738,377 | A | * | 4/1998 | Sugiki et al. | 280/777 |
| 5,755,018 | A | * | 5/1998 | Grolik et al. | 24/68 SB |
| 5,971,489 | A | * | 10/1999 | Smithson et al. | 297/472 |

(Continued)

OTHER PUBLICATIONS

Boljanovic, Vukota Ph.D, Sheet Metal Forming Processes and Die Design, 2004, Industrial Press, pp. 45-60.*

(Continued)

*Primary Examiner* — Glenn Dayoan
*Assistant Examiner* — Melissa A Black
(74) *Attorney, Agent, or Firm* — Fredrick Vernon Owens; Alleman Hall McCoy Russell & Tuttle LLP

(57) ABSTRACT

An attachment assembly for securing a child safety seat to a mounting portion of a vehicle is provided. The attachment assembly may include a guide having a channel, and a metal strap positioned in the channel of the guide in a retracted configuration such that a free end of the metal strap is adjacent to a front face of the guide, a fixed end of the metal strap is secured to a side of the channel, and a body of the strap is bent along a radius so as to double back between the free end and the fixed end. When pulled in tension, the metal strap is configured to transition from the retracted configuration to an extended configuration, and the guide is configured to constrain the strap during this transition so that the strap rolls along the radius within the guide, thereby absorbing energy.

19 Claims, 5 Drawing Sheets

U.S. PATENT DOCUMENTS

| | | |
|---|---|---|
| 6,168,205 B1 * | 1/2001 | Smithson et al. ............. 280/805 |
| 6,279,680 B1 * | 8/2001 | Casebolt ........................... 182/3 |
| 6,312,057 B1 * | 11/2001 | Feile ............................. 297/471 |
| 6,394,241 B1 * | 5/2002 | Desjardins et al. ........... 188/376 |
| 6,485,055 B1 | 11/2002 | Swayne et al. |
| 6,517,154 B2 | 2/2003 | Sawamoto |
| 6,729,428 B2 * | 5/2004 | Jitsui ............................ 180/268 |
| 6,736,427 B2 * | 5/2004 | Herrmann et al. ............ 280/805 |
| 6,767,057 B2 | 7/2004 | Neelis |
| 7,520,555 B2 * | 4/2009 | Malapati et al. ............. 296/68.1 |
| 7,527,221 B2 * | 5/2009 | Humfeldt et al. .......... 244/118.5 |
| 2002/0043830 A1 * | 4/2002 | Sawamoto ............... 297/216.11 |
| 2004/0051356 A1 * | 3/2004 | Neelis ........................... 297/253 |
| 2005/0012319 A1 * | 1/2005 | Schulz .......................... 280/805 |
| 2005/0217608 A1 | 10/2005 | Johnson et al. |
| 2006/0049622 A1 | 3/2006 | Yamamoto |
| 2008/0136223 A1 * | 6/2008 | Murphy et al. .......... 297/216.11 |
| 2008/0136225 A1 * | 6/2008 | Murphy et al. .......... 297/216.11 |

OTHER PUBLICATIONS http://www.precisionsheetmetal.com/home/design.htm, 2004.*
http://www.precisionsheetmetal.com/home/materials.htm, 2004.*
http://www.me.umn.edu/education/courses/me3221-sum/Overviews/SheetMetal/sheetmetal.html, 2006.*
Du, Jun et al., The Bending Process, 1997.*

* cited by examiner

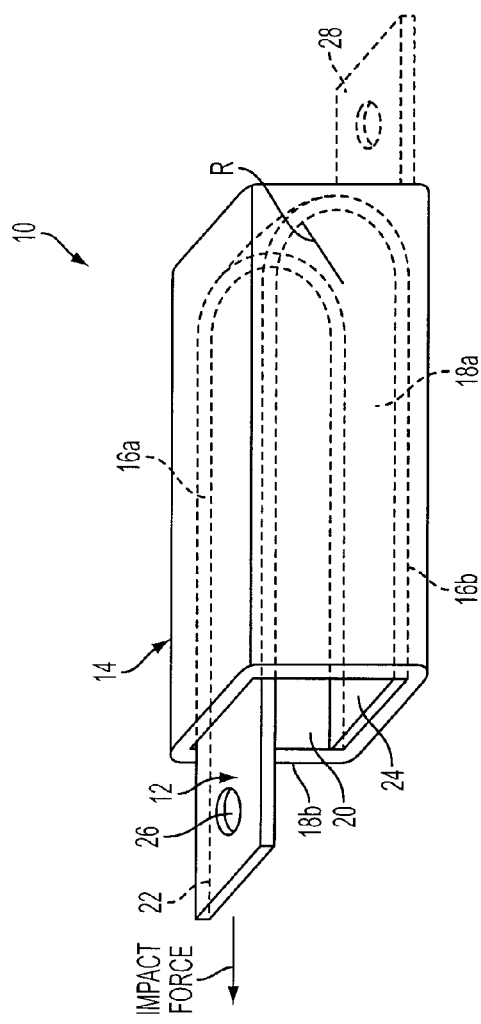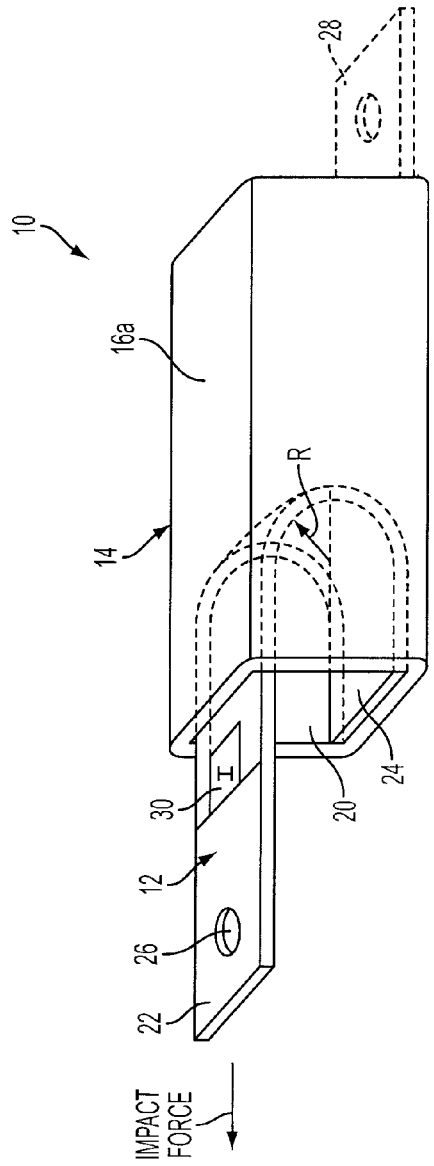

ENERGY ABSORBING SEAT ANCHOR RESTRAINT SYSTEM FOR CHILD SAFETY SEATS

FIELD OF INVENTION

The present application relates to an energy absorbing seat anchor restraint system for child seats.

BACKGROUND

To meet Federal Motor Vehicle Safety Standards, a vehicle may include an upper anchor attachment to receive a child safety seat tether hook connected to an upper portion of the child safety seat back. The connection of the upper portion of the child safety seat to the vehicle may reduce the forward movement of the child safety seat during a frontal crash. However, the shock applied by child safety seat restraining equipment to the child safety seat occupant may increase in the case of a forward vehicle collision.

One approach to reduce the impact of the collision force to the child safety seat is described in the U.S. Pat. No. 6,767,057. In particular, anchor attachments to the child safety seat with energy absorbing mechanisms are disclosed. In one example, the upper anchorage assembly includes a steel U-shaped bracket with a first end secured to the vehicle horizontally and a second end having a latchable portion for releasable engagement with the corresponding upper child seat latch. If the predetermined forward force is exceeded, the U-shaped bracket bends forward and is deformed. The deformation of the bracket absorbs energy.

However, the inventors herein have recognized disadvantages with such an energy absorbing device. Specifically, the steel, U-shaped bracket may not maintain desired loads under a range of impact energy to the child safety seat. For example, small deformation or no deformation may be desired for the anchor attachment under low impact force so that the child safety seat can be kept in position. In some situations, it may be desired to have constant deformation or constant load exerting to the child safety seat under a certain range of impact energy. However, the steel, U-shaped bracket described in the U.S. Pat. No. 6,767,057 cannot achieve the above objectives.

SUMMARY OF THE INVENTION

In one approach, the above issues may be addressed by an attachment assembly for securing a child safety seat to a mounting portion of a vehicle. The attachment assembly comprises a guide having a channel open to a front face of the guide, the guide being secured to the vehicle; and a metal strap positioned in the channel of the guide in a retracted configuration such that a free end of the metal strap is adjacent to a front face of the guide, a fixed end of the metal strap is secured to a side of the channel, and a body of the strap is bent along a radius so as to double back between the free end and the fixed end. When the metal strap is pulled in tension, the metal strap is configured to transition from the retracted configuration to an extended configuration, and the guide is configured to constrain the strap during this transition so that the strap rolls along the radius within the guide, thereby absorbing energy.

According to another aspect, an attachment assembly for securing a child safety seat to a vehicle is provided. The attachment assembly comprises a first connecting portion configured to be coupled to the child safety seat; a second connecting portion configured to be coupled to the mounting portion of the vehicle; a box having side walls, the box being secured to the mounting portion of the vehicle; and a metal strap positioned in the box in a retracted configuration such that a free end of the metal strap is adjacent a front face of the box, a fixed end of the metal strap is secured to a wall of the box and a body of the strap is bent along opposed walls so as to double back between the free end and the fixed end wherein, when the strap is pulled in tension, the metal strap is configured to transition from the retracted configuration to an extended configuration, and the box is configured to constrain the strap during this transition so that the strap rolls along the radius within the box, thereby absorbing energy.

According to yet another aspect, an energy-absorbing attachment assembly for securing a child safety seat to a vehicle is provided. The energy-absorbing attachment assembly comprises metal strap means for absorbing energy during pulling of the metal strap in tension from a retracted state to an extended state; and guide means for constraining movement of the metal strap during transition from the retracted to the extended state, to control the amount of energy absorbed during pulling.

The attachment assemblies described above have various advantages. For example, because the metal strap is constrained in the guide, the forward movement or the rolling of the strap along the walls of the guide may occur in a controlled manner during a collision event. In one embodiment where the width and thickness of the strap is constant along the length of the strap, the attachment assembly can be configured to achieve a substantially constant load for a desired length of the rolling of the metal strap at a radius within the guide. As a result, constant load may be applied to the child safety seat which may be desired at some situations.

DESCRIPTION OF THE DRAWINGS

FIG. 1 is a perspective view of an exemplary embodiment of an attachment assembly for securing a child safety seat to a vehicle, schematically illustrating the attachment assembly with a metal strap in a retracted state.

FIG. 2 is a perspective view of an exemplary embodiment of an attachment assembly for securing a child safety seat to a vehicle, schematically illustrating the attachment assembly with a metal strap in an extended state.

DETAILED DESCRIPTION OF THE PREFERRED EMBODIMENTS

Figure 3:
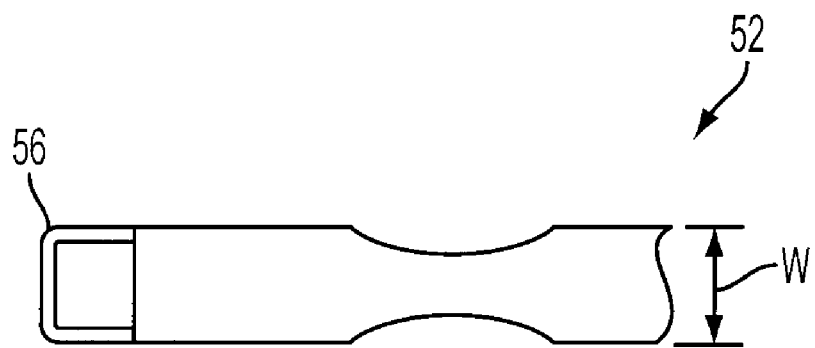
FIG. 3 is a top view of a first embodiment of a metal strap placed in an attachment assembly for securing a child safety seat to a vehicle.

FIG. 1 is a perspective view of an exemplary embodiment of an attachment assembly 10 for securing to a child safety seat (not shown) of a vehicle (not shown), schematically illustrating the attachment assembly with a metal strap 12 in a retracted state. FIG. 2 is a perspective view of the exemplary embodiment of an attachment assembly for securing a child safety seat to a vehicle shown in FIG. 1, schematically illustrating the attachment assembly with a metal strap in an extended state. As shown in FIGS. 1 and 2, attachment assembly 10 may include a guide 14 and a deformable structure 12 positioned within guide 14. In the depicted embodiment, deformable structure 12 includes a strap. In some embodiments, a metal strap may be used.

Guide 14 may be elongate and box-shaped, and typically is formed of a thin-walled tube. Guide 14 may have two sets of opposed side walls 16a, 16b and 18a, 18b. Guide 14 may have an open side 20 which is perpendicular to the opposed side walls. Metal strap 12 may have a free end 22 that is positioned adjacent to open side 20, and a fixed end 24 that is secured to wall 16b of guide 14. Fixed end 24 may be secured to wall 16b by any suitable method such as welding or bolting.

A body of metal strap 12 is positioned along side walls 16a and 16b and the body of the strap is bent along a radius, R, so as to double back between free end 22 and fixed end 24. Free end 22 may include a latchable portion 26 which forms a seat-side connecting portion for coupling to the child safety seat. Guide 14 may be coupled to a mounting portion of a vehicle by any suitable mechanisms. For example, guide 14 may be coupled to the mounting portion by welding, bolting, or bracketing. Further, guide 14 may include a vehicle-side connecting portion 28 in the form of a tab with an opening through which a fastener may be passed to couple the attachment assembly to the mounting portion of the vehicle.

In the embodiment depicted in FIGS. 1 and 2, width and thickness of metal strap 12 are constant along a length of metal strap 12. By way of example, metal strap 12 may have a width, length, and thickness of 0.75, 3, and 0.11 inches, respectively, guide 14 may have a width, length, and height of 1, 1, and 1 inches, respectively, and the thickness of the walls of guide 14 may be 0.125 inches. In another example embodiment, metal strap 12 may have a width, length, and thickness of 0.75, 13, and 0.11 inches, respectively, and guide 14 may have a width, length, and height of 1, 6, and 1 inches, respectively.

In some embodiments, metal strap 12 may include a warning indicator 30 indicating the need for replacement of the attachment assembly. Warning indicator 30 may be positioned such that it is hidden within the guide when the metal strap is in the retracted configuration, and such that it is visible to a user when the metal strap is in the extended configuration as shown in FIG. 2.

The attachment assembly 10 may be positioned at different orientations. In the depicted embodiment in FIGS. 1 and 2, side wall 16b, having fixed end 24, is a bottom side and may be substantially horizontal relative to a floor of the vehicle. Alternatively, side wall 16b may be a top side relative to the floor of the vehicle. Depending on the mounting positions as described in detail below, side walls 16a and 16b may be substantially perpendicular relative to the floor of the vehicle.

The metal strap's thickness, yield strength, and length, allow it to deform and roll along the radius R with the box in response to a force applied to it. During normal vehicle driving, metal strap 12 is sufficiently rigid to resist movement of the child seat so that metal strap 12 is maintained in a retracted configuration as shown in FIG. 1. During a collision event, the inertia of the child safety seat system generates a forward force applied to attachment assembly 10 as indicated by an arrow. When the force is below a predetermined level, such as during panic braking, attachment assembly 10 may be maintained in the retracted configuration so that the child safety seat is inhibited from moving. In one example, a panic braking force of 200 lbs. may be used as the predetermined level, assuming a 70 lb. child and a 30 lb. child safety seat. Under these conditions, metal strap 12 may be configured not to be deformed or extended more than 0.25 inches at the panic braking load of 200 lbs. However, as the force exceeds the predetermined level, metal strap 12 may be rolled along the radius R within guide 14. As a result, strap 12 is transitioned from the retracted configuration to an extended configuration as shown in FIG. 2, thereby absorbing kinetic energy and reducing the force on the child safety seat.

It should be appreciated that variations to the embodiment described above are possible. In another example, guide 14 may be a tube or any suitable configuration with a channel that allows and constrains the movement of strap 12 inside the channel.

Further, the width, thickness, or internal construction of the strap 12 may be varied along a length of the strap. FIG. 3 shows a top view of a strap 52 having varied width W. In the depicted embodiment, an intermediate portion of the strap has a decreased width compared to the end portions of the strap. It should be noted that the size, shape, and number of the portions of decreased width may be varied to adapt the strap to the requirements for the child safety seat.

FIG. 3 further shows an alternative form of seat-side connecting portion for coupling the attachment assembly to the child safety seat, in the form of a latchable portion 56. The latachable portion 56 may be a loop formed from a bar or wire, to which a tether or strap may be attached, which in turn is coupled to the child safety seat.

Figure 4:
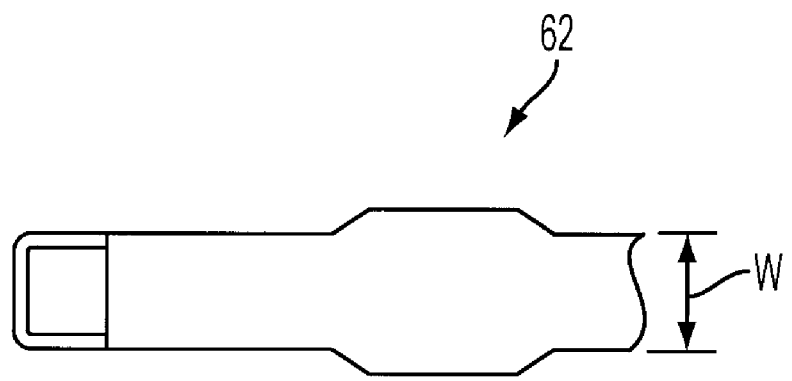
FIG. 4 is a top view of a second embodiment of a metal strap placed in an attachment assembly for securing a child safety seat to a vehicle.

FIG. 4 is a top view of a second embodiment of a metal strap 62 with varied width. In the depicted embodiment, an intermediate portion of the strap has a greater width compared to the end portions of the strap. It should be noted that the width may be varied at any segment of strap 62 to be adapted to the requirements for the load applied to the child safety seat.

Figure 5:
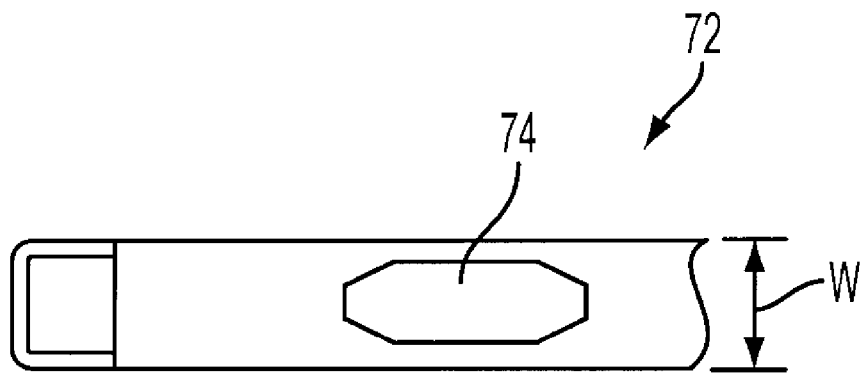
FIG. 5 is a top view of a third embodiment of a metal strap placed in an attachment assembly for securing a child safety seat to a vehicle.

FIG. 5 is a top view of a third embodiment of a metal strap 72 with an internal construction including an opening 74 formed inside of the metal strap along a portion of its length. In the depicted embodiment, one opening is shown; however, a plurality of openings may be included if desired. Further, it will be appreciated that the size of the openings may be varied. The size and number of the openings may be varied to desirably affect the deformation or energy absorbing characteristics of the attachment assembly. In the depicted embodiment, opening 74 is located approximately at an intermediate portion of metal strap 72.

Figure 6:
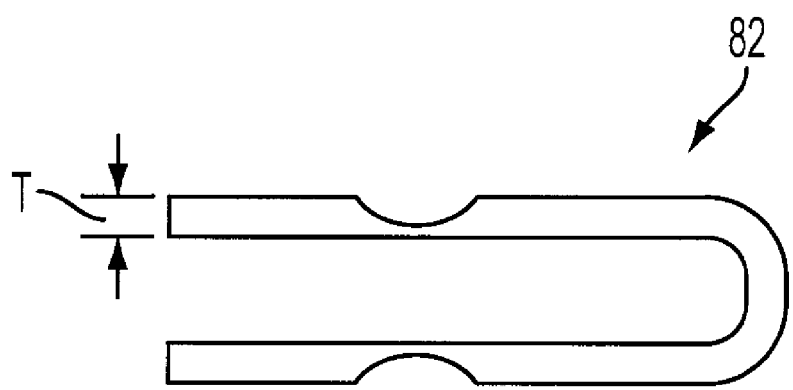
FIG. 6 is a side view of a fourth embodiment of a metal strap placed in an attachment assembly for securing a child safety seat to a vehicle.

FIG. 6 shows a side view of a fourth embodiment of metal strap 82 having varied thickness, T. In the depicted embodiment, two intermediate portions of the metal strap are shown to be of decreased thickness. Again, it should be noted that the size, shape, and number of the portions of decreased thickness may be varied to adapt the strap to specific requirement for the child safety seat. In addition, it should be appreciated that the strap may include portions of increased thickness instead of or in addition to portions of decreased thickness.

Figure 7:
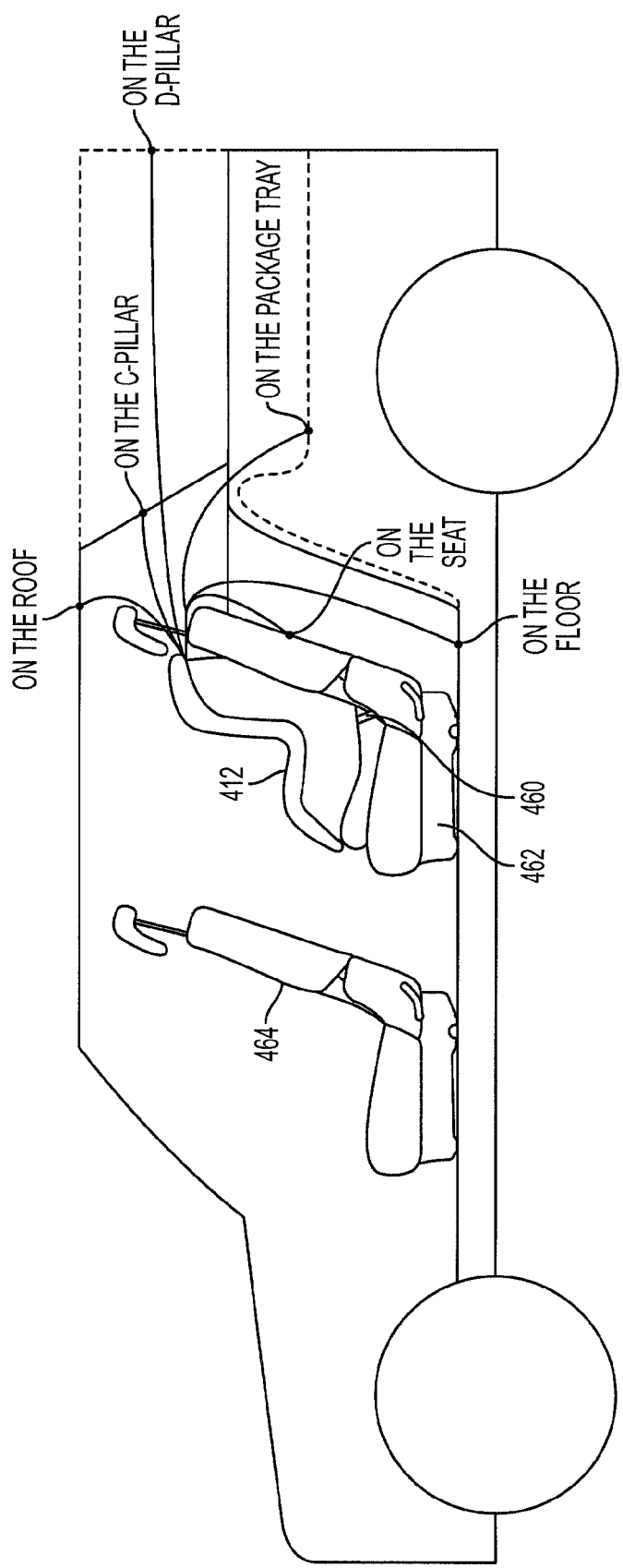
FIG. 7 is a cross-sectional view of a vehicle, schematically illustrating mounting portions in the vehicle to secure an attachment assembly which forms an upper anchorage and lower anchorage for a child safety seat.

FIG. 7 is a cross-sectional view of a vehicle having a driver seat 464, passenger seat 462, and child safety seat 412, schematically illustrating mounting portions of a vehicle chassis to which attachment assembly 10 may be secured when used as an upper anchorage or a lower anchorage for child safety seat 412. Attachment assembly 10 may be used in an upper anchorage for an upper tether of the child safety seat. The upper anchorage may be mounted at various portions of the vehicle. As shown in FIG. 7, the attachment assembly for the upper anchorage may be mounted on the package tray, roof, seat, floor, or C-pillar of a sedan type vehicle. The attachment assembly for the upper anchorage may be further mounted on the D-pillar of a wagon as indicated by the vertical dashed line in FIG. 7. Further, it will be appreciated that attachment assembly 10 may also be used as a lower anchorage. For example, attachment assembly 10 may be coupled to a lower end of child safety seat 412 and the mounting portion may be positioned in a bight 460, thereby forming a lower anchorage.

Figure 8:
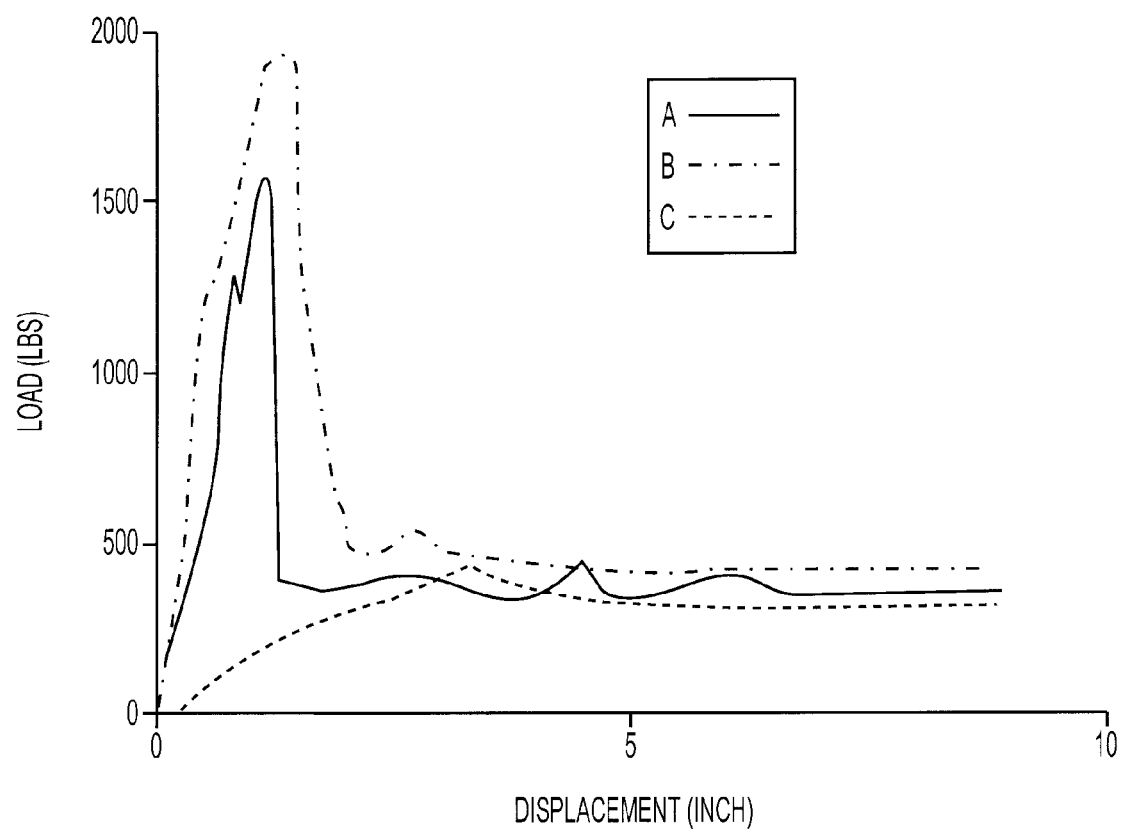
FIG. 8 shows a relationship between load and displacement for different embodiments of attachment assemblies.

FIG. 8 shows relationships between load and displacement for different embodiments of attachment assemblies. Curve A illustrates that load (lbs) changes over the displacement (inches) of a metal strap with constant width, such as in the attachment assembly shown in FIGS. 1-2. The initial force or load required to pull the metal strap has a spike as shown by curve A. After the spike, the load becomes constant as the displacement increases. Curve B illustrates that load (lbs) changes over the displacement (inches) of a metal strap with varied width, such as in the attachment assembly depicted in FIG. 4. Because the width of the strap is widened along the length, greater initial load is required to move the strap compared with a strap with a constant width. Curve C illustrates that load (lbs) changes over the displacement (inches) of a metal strap with the varied shapes that are illustrated in the embodiments of FIG. 5 and FIG. 6. Since the energy absorbed by the strap decreases due to an opening in the strap or less thickness in some parts of the strap, the initial load required to move the strap is less.

While the strap used in the above embodiments has been described as being metal, it will be appreciated that other suitable materials may be used that absorb energy when deformed in the manner described above.

The embodiments of attachment assembly 10 described above have various advantages. For example, because the metal strap is constrained in the guide, the forward movement or the rolling of the strap along the walls of the guide may occur in a controlled manner during a collision event. In one embodiment where the width and thickness of the strap is constant along the length of the strap, the attachment assembly can be configured to achieve a substantially constant load for a desired length of the rolling of the metal strap at a radius within the guide. As a result, constant load may be applied to the child safety seat which may be desired at some situations. However, if variable loads applied to the child safety seat during a collision are desirable, the width, thickness, or configuration of the strap may be varied along the length of the strap. Thus, since the section strength and deformation of the strap changes as the strap rolls corresponding to the radius along the guide, the resulting loads applied to the child safety seat varies.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An attachment assembly for securing a child safety seat to a mounting portion of a vehicle, the attachment assembly comprising:
   a guide having a channel open to a front face of the guide, the channel including a first side wall and a second side wall opposite to the first side wall, and the first side wall being secured to the vehicle; and
   a flat metal strap positioned along the first side wall and the second side wall in the channel of the guide in a retracted configuration such that a free end of the metal strap is adjacent to the front face of the guide, a fixed end of the metal strap is secured to a side of the channel, and a body of the metal strap is bent along a radius so as to double back between the free end and the fixed end where the radius is larger than a thickness of the metal strap and is limited by a distance between the first side wall and the second side wall;
   wherein the metal strap has a first thickness of metal in a first region that decreases to a second thickness of metal in a second region along a length of the strap, the second thickness of metal is continuous across a width of the strap, the second region is positioned away from the radius, and the second region is between the fixed end and the radius when the strap is in the retracted configuration;
   wherein, when the metal strap is pulled in tension, the metal strap is configured to transition from the retracted configuration to an extended configuration, the radius being freely movable in a direction of the transition, and transitioning of the metal strap is constrained by contact of the metal strap with the first side wall and the second side wall so that the strap rolls along the radius within the guide, thereby absorbing energy, wherein the second region travels through the radius when the strap transitions from the retracted configuration to the extended configuration to thereby vary an amount of energy absorbed by rolling different portions of the metal strap along the radius within the guide.

2. The attachment assembly of claim 1, wherein the channel is formed by opposed top and bottom walls and opposed side walls that collectively enclose the strap.

3. The attachment assembly of claim 1, wherein the guide is formed of a thin walled tube, the channel being formed therein.

4. The attachment assembly of claim 1, wherein a width of the metal strap varies along a length of the metal strap, to thereby vary an amount of energy absorbed by rolling different portions of the metal strap along the radius within the guide.

5. The attachment assembly of claim 1, wherein the attachment assembly further includes a warning indicator positioned on the metal strap indicating a need for replacement of the attachment assembly, the warning indicator being positioned such that it is hidden within the guide when the metal strap is in the retracted configuration, and such that it is visible to a user when the metal strap is in the extended configuration.

6. The attachment assembly of claim 1, wherein the free end of the metal strap includes a connecting portion that couples the attachment assembly to the child safety seat.

7. The attachment assembly of claim 1, wherein the free end of the metal strap is coupled to an upper end of the child safety seat, to thereby form an upper anchorage.

8. The attachment assembly of claim 7, wherein the vehicle mounting portion is selected from the group consisting of a location on a C-pillar, a D-pillar, a roof, a package tray, a seat, a seat frame, and a floor of the vehicle.

9. The attachment assembly of claim 1, wherein the guide is coupled to a lower end of the child safety seat and the vehicle mounting portion is positioned in a bight of a seat of the vehicle, thereby forming a lower anchorage.

10. The attachment assembly of claim 1, wherein the radius is at least two times greater than the thickness of the metal strap.

11. The attachment assembly of claim 1, wherein the metal strap has a first thickness of metal in a first region that decreases to a second thickness of metal in a second region along the length of the strap.

12. The attachment assembly of claim 11, wherein the second thickness of metal is continuous across a width of the strap.

13. The attachment assembly of claim 11, wherein the second region is positioned away from the radius.

14. The attachment assembly of claim 11, wherein the second thickness of metal is continuous across a width of the strap, the second region is positioned away from the radius, and the second region is between the fixed end and the radius when the strap is in the retracted configuration.

15. The attachment assembly of claim 11, wherein the strap has the first thickness of metal in a third region that decreases to the second thickness of metal in a fourth region along the length of the strap.

16. The attachment assembly of claim 15, wherein the second region and the fourth region are aligned when the strap is in the retracted configuration.

17. The attachment assembly of claim 15, wherein at least one of the second region and the fourth region is positioned along the length of the strap between the fixed end and the radius when the strap is in the retracted configuration.

18. An attachment assembly to attach a child safety seat to a mounting portion of a vehicle, comprising:
   a first connecting portion configured to be coupled to the child safety seat;
   a second connecting portion configured to be coupled to the mounting portion of the vehicle;
   a box having a first set of side walls and a second set of side walls, the box being secured to the mounting portion of the vehicle; and
   a metal strap positioned in the box in a retracted configuration such that a free end of the metal strap is adjacent a front face of the box, a fixed end of the metal strap is secured to one of the first set of side walls of the box and a body of the metal strap is bent along the first set of side walls and the second set of side walls with a radius so as to double back between the free end and the fixed end wherein the radius is at least two times a thickness of the metal strap and is limited by a distance between the first set of side walls,
   wherein the metal strap is pulled in tension and configured to transition from the retracted configuration to an extended configuration, the radius being freely movable in a direction of the transition, and the box is configured to constrain the strap during this transition so that the strap rolls along the radius within the box, thereby absorbing energy,
   wherein the metal strap has a first thickness of metal in a first region that decreases to a second thickness of metal in a second region along a length of the strap, the second thickness of metal is continuous across a width of the strap, the second region is positioned away from the radius, the second region is between the fixed end and the radius when the strap is in the retracted configuration, wherein the second region travels through the radius when the strap transitions from the retracted configuration to the extended configuration.

19. The attachment assembly of claim 18, further comprising:
   a warning indicator positioned on the metal strap indicating a need for replacement of the attachment assembly, the warning indicator being positioned such that it is hidden within the guide when the metal strap is in the retracted configuration, and such that it is visible to a user when the metal strap is in the extended configuration.

* * * * *